UNITED STATES PATENT OFFICE.

FRIEDRICH ALEXANDER RITSCHKE, OF GEESTHACHT-ON-THE-ELBE, GERMANY, ASSIGNOR TO E. I. DU PONT DE NEMOURS POWDER COMPANY, OF WILMINGTON, DELAWARE, A CORPORATION OF NEW JERSEY.

SMOKELESS NITROCELLULOSE-NITROGLYCERIN POWDER AND METHOD OF MAKING THE SAME.

1,063,469.     Specification of Letters Patent.     Patented June 3, 1913.

No Drawing.     Application filed November 14, 1911. Serial No. 660,288.

*To all whom it may concern:*

Be it known that I, FRIEDRICH ALEXANDER RITSCHKE, a subject of the Emperor of Germany, residing at Geesthacht-on-the-Elbe, Germany, have invented a new and useful Improvement in Smokeless Nitrocellulose-Nitroglycerin Powder and Methods of Making the Same, of which the following is a full, clear, and exact description.

Nitrocellulose-nitroglycerin powder has, till now, generally been made with the use of considerable quantities of volatile solvents, the elimination of which from the powder is difficult and takes a considerable time. Extensive experiments have of late been made to produce such a powder without the use of volatile solvents or the assistance of non-volatile substances having a gelatinizing influence which remain in the powder.

In the manufacture of such powder paste without volatile or non-volatile solvents, it has now been shown that in consequence of the high temperatures which have to be applied in their manufacture, acid gaseous products may be formed, which greatly impair the ultimate stability of the finished product.

I have discovered by the addition of a slight percentage of the double salts of ammonium, such as sodium ammonium oxalate, notwithstanding the high temperature prevailing during manufacture, these difficulties are removed, and a finished product of high stability produced. The nitroglycerin content should be less than 30%.

As an example I may mention: 25% nitroglycerin, 74% nitrocellulose, 1% sodium ammonium oxalate are, after being mechanically kneaded, rolled at a temperature of 90°–100° centigrade, pressed into tubes at the same temperature, using according to the dimensions of the tube, a pressure of between 400 to 1000 atmospheres.

I do not intend to limit myself specifically to sodium ammonium oxalate, except where the same may be specifically claimed. Nor do I intend to limit myself to the use of one per cent. of sodium ammonium oxalate as the intention is that the amount of the double salt of ammonium, for instance, sodium ammonium oxalate, shall be proportionately very small.

Having now fully described my invention, what I claim and desire to protect by Letters Patent is:

1. An improvement in the method of manufacturing smokeless powders containing nitrocellulose and less than thirty per cent. of nitroglycerin which consists in adding to the ingredients a double salt of ammonium without employing volatile solvents.

2. An improvement in the method of manufacturing smokeless powders containing nitrocellulose and less than thirty per cent. of nitroglycerin which consists in adding to the ingredients a double salt of ammonium without employing volatile solvents, shaping the mixture under heat and pressure.

3. An improvement in the method of manufacturing smokeless powders containing nitroglycerin and nitrocellulose, which consists in adding to the ingredients a double salt of ammonia without employing volatile solvents, heating the mixture to a temperature of about 90° to 100° C., and shaping under a pressure of from 400 to 1000 atmospheres.

4. An improvement in the method of manufacturing smokeless powders containing nitroglycerin and nitrocellulose, which consists in adding to the ingredients a double salt of ammonium in amount not exceeding five per cent. without employing volatile solvents.

5. An improvement in the method of manufacturing smokeless powders containing nitroglycerin and nitrocellulose, which consists in adding to the ingredients a double salt of ammonium in amount not exceeding five per cent. without employing volatile solvents and shaping the mixture under heat and pressure.

6. An improvement in the method of manufacturing smokeless powders containing nitroglycerin and nitrocellulose, which consists in adding to the ingredients a double oxalate of ammonium in amount not exceeding five per cent. without employing volatile solvents.

7. An improvement in the method of manufacturing smokeless powder containing nitroglycerin and nitro cellulose, which consists in adding to the ingredients sodium ammonium oxalate in amount not exceeding five per cent. without employing volatile solvents.

In testimony of which invention, I have hereunto set my hand, at Hamburg, on this 24th day of October, 1911.

FRIEDRICH ALEXANDER RITSCHKE.

Witnesses:
ERNEST H. L. MUMMENHOFF,
IDA CHRIST. HAFERMANN.